(12) United States Patent
Dermeik et al.

(10) Patent No.: US 8,303,835 B2
(45) Date of Patent: *Nov. 6, 2012

(54) COMPOSITION FOR TREATMENT OF FIBER MATERIALS BY EXHAUST METHOD IN PARTICULAR

(75) Inventors: Salman Dermeik, Augsburg (DE); Karl-Heinz Lemmer, Augsburg (DE); Reinhold Braun, Schwabmunchen (DE); Walter Nassl, Affing (DE)

(73) Assignee: Huntsman Textile Effects (Germany) GmbH, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/997,303

(22) PCT Filed: Jun. 5, 2009

(86) PCT No.: PCT/EP2009/004036
§ 371 (c)(1),
(2), (4) Date: Dec. 10, 2010

(87) PCT Pub. No.: WO2009/149870
PCT Pub. Date: Dec. 17, 2009

(65) Prior Publication Data
US 2011/0114904 A1  May 19, 2011

(30) Foreign Application Priority Data

Jun. 12, 2008 (EP) .................... 08010665

(51) Int. Cl.
*D06M 13/292* (2006.01)
*C09K 21/12* (2006.01)
*C08K 5/521* (2006.01)
*G08G 79/04* (2006.01)

(52) U.S. Cl. ...... 252/8.84; 252/8.91; 252/609; 524/115; 524/121; 524/140; 524/141; 28/169; 427/385.5; 427/389.9; 427/207.1; 8/115.64; 8/115.65; 8/115.66

(58) Field of Classification Search .................. 252/609, 252/8.84, 8.91; 8/115.64, 115.65, 115.66; 524/115, 121, 140, 141; 427/385.5, 389.9, 427/207.1; 28/169; 169/45
See application file for complete search history.

(56) References Cited

U.S. PATENT DOCUMENTS

| | | | |
|---|---|---|---|
| 2,286,726 A | 6/1942 | Gordon | |
| 3,051,585 A * | 8/1962 | Bean et al. | 428/339 |
| 3,374,292 A | 3/1968 | Zahir | |
| 3,819,324 A * | 6/1974 | Bino | 8/403 |
| 3,922,737 A | 12/1975 | von der Eltz | |
| 3,930,079 A * | 12/1975 | Hashizume et al. | 427/396 |
| 4,524,191 A * | 6/1985 | Nakamura et al. | 525/425 |
| 5,457,221 A | 10/1995 | Brady et al. | |
| 5,646,240 A * | 7/1997 | Oishi et al. | 528/403 |
| 5,997,584 A * | 12/1999 | Andersen et al. | 8/137 |
| 7,521,496 B2 * | 4/2009 | Tokuyasu et al. | 524/116 |
| 2004/0127609 A1 * | 7/2004 | Strand et al. | 524/115 |
| 2006/0166579 A1 * | 7/2006 | Smith et al. | 442/59 |
| 2006/0247339 A1 * | 11/2006 | Harashina et al. | 524/100 |
| 2007/0197698 A1 * | 8/2007 | Nakamura | 524/147 |
| 2009/0068369 A1 * | 3/2009 | Dermeik et al. | 427/412 |
| 2010/0000030 A1 * | 1/2010 | Dermeik et al. | 8/497 |
| 2010/0044653 A1 | 2/2010 | Dermeik et al. | |

FOREIGN PATENT DOCUMENTS

| | | |
|---|---|---|
| DE | 2509592 | 11/1975 |
| EP | 1935935 | 6/2008 |
| JP | 2004-225175 | 8/2004 |
| JP | 2004-225176 | 8/2004 |
| JP | 2006-299486 | 11/2006 |
| WO | WO 99/67326 | 12/1999 |
| WO | WO 00/11085 | 3/2000 |
| WO | WO 2004-060990 | 7/2004 |

* cited by examiner

*Primary Examiner* — Joseph D Anthony

(57) ABSTRACT

Compositions useful for conferring a flame-retardant finish on polyester materials by means of an exhaust process comprise a triester of phosphoric acid, a polyester and an amine or ammonium salt as well as water.

14 Claims, No Drawings

COMPOSITION FOR TREATMENT OF FIBER MATERIALS BY EXHAUST METHOD IN PARTICULAR

CROSS REFERENCE TO RELATED APPLICATIONS

This application is the National Phase of International Application PCT/EP2009/004036 filed Jun. 5, 2009 which designated the U.S. and which claims priority to European Patent Application (EP) 08010665.1 filed Jun. 12, 2008. The noted applications are incorporated herein by reference.

FIELD OF THE INVENTION

This invention relates to a composition for treating fiber materials.

BACKGROUND OF THE INVENTION

It is known to endow fiber materials such as woven fabrics for example with flame-retardant properties by treating them with certain liquid compositions. A number of known compositions of this type contain phosphorus compounds. This is apparent inter alia from U.S. Pat. No. 3,374,292, DE-A 25 09 592 and also from the abstracts of JP 2004-225 175 A2 and JP 2004-225 176 A2 in Chemical Abstracts (AN 141:175439 CA and AN 141:175 440 CA).

Also deserving of mention in connection with flame-retardant compositions are WO 2004/060990 A2 and the Derwent publication with AN 2006-806707 (concerning JP 2006/299 486 A), WO 00/11085 A and WO 99/67326 A.

Treating fiber materials for the purpose of rendering them flame retardant can be done, as will be known, by following various methods. In some cases, the flame-retardant composition can be applied by spraying. However, there are limits to spraying because the sprayability of possible components may be an issue and because of possible risks to the people doing the spraying.

A more frequently employed method is that of bath-impregnating the fiber materials by means of a padding process. In a padding process, however, only some of the flame retardant present in the padding liquor will end up on the fiber material, and this may lead to appreciable losses of costly products.

The exhaust method is very largely or completely free of the aforementioned disadvantage of the padding process. In the exhaust method, the fiber materials are treated with aqueous liquors that contain active substances such as flame retardants for example, and the fiber materials absorb these active substances quantitatively or almost quantitatively, so that the liquor depletes in these active substances in the course of its application. The numerous known processes for producing various grades of flame resistance on synthetic or blend fabrics have various disadvantages, of which the lack of durability to washing is mentioned most frequently. The currently best-known processes consist of a surface treatment which is subsequently subjected to thermosoling at 180° C. to 210° C. The cyclic phosphonates frequently employed for this purpose are readily water-soluble before fixing and are not durable to washing without thermosoling. Polymeric flame retardants, however, which remain on the surface, usually lead to a harsher hand for the textile. In contrast to fixing on the fiber surface in dry heat or by means of high-temperature thermosoling, the flame retardants introduced into the fiber from a high-temperature liquor by the exhaust method can also be combined simultaneously with a dyeing in one operation. An example of an apparatus for such a treatment is known from U.S. Pat. No. 3,922,737. But even without a combination with dyeing, such a treatment yields significant advantages, for example a superior permanence without thermosoling.

However, the matter is that a composition is particularly useful for the exhaust process when it is in the form of an aqueous dispersion but this dispersion does not have high stability. In contrast, aqueous dispersions used for padding processes should have good stability in order that they may not separate into their constituents on prolonged storage.

Some prior art compositions are aqueous dispersions having good stability after prolonged storage times. Such dispersions are useful for padding processes, but only of limited effectiveness in exhaust processes, since limited dispersion stability leads to optimum results in padding processes.

Prior art compositions additionally have further disadvantages when used for flame-retardant finishing.

For instance, relatively large amounts of phosphorus compounds are frequently required for prior art compositions to achieve acceptable flame protection. This applies even when the fiber materials consist wholly or predominantly of polyester.

SUMMARY OF THE INVENTION

The present invention has for its object to provide a composition that enables fiber materials consisting wholly or predominantly of polyester to be given a good flame-retardant finish in that good flame-retardant performance should be achieved at a lower add-on for the composition on the fiber materials than in the case of known finishes comprising phosphorus compounds, and that should be very suitable for use in exhaust processes in particular. The present invention further has for its object to develop a process for treating fiber materials, particularly fiber materials composed of polyester, that leads to good flame-retardant properties on the part of the treated fiber materials even when the exhaust liquor additionally contains dyes and/or UV absorbers.

We have found that this object is achieved by a composition comprising at least a component A, a component B, a component C and a component D, wherein said component A is a triester of phosphoric acid, wherein said component B is a polyester which does not contain any aromatic radicals in the unit derived from the alcohol and wherein 0% to 10% of the units derived from the acid contain aromatic radicals, wherein said component C is an amine, preferably a secondary amine or a polymeric amine, or an ammonium salt wherein the cation of this ammonium salt is of the form $NR_4^{\oplus}$ where at least one of the R radicals is alkyl of 1 to 22 carbon atoms, and wherein said component D is water, wherein every one of said components A, B and C may take the form of a mixture of two or more components A, B and C, respectively, in place of a single component A product, component B product and component C product, respectively, and by a process for treating a fiber material wherein the fiber material is contacted, preferably by means of an exhaust process, with a composition of the type mentioned.

Treatment with compositions of the present invention provides good flame-retardant properties to fiber materials. The fiber materials can be fibers or yarns; preferably, they are textile fabrics in the form of wovens or nonwovens. Compositions of the present invention even provide good flame-retardant properties to fiber materials consisting of polyester, particularly polyethylene terephthalate or polybutylene terephthalate, to an extent ranging from 80% to 100% by weight. Treating such polyester materials constitutes a preferred use for compositions of the present invention. However, other fiber materials can also be rendered flame retardant, examples being fiber materials composed of wool or of fiber blends containing less than 80% by weight of polyester.

The compositions of the present invention are particularly suitable for use in the exhaust process. They have a particular additional advantage here in that these exhaust processes can be carried out at relatively low temperatures, for example in the range from 60° C. to 100° C.

The compositions of the present invention are preferably aqueous dispersions that have but limited (storage) stability and therefore are very useful for exhaust processes. Component C is responsible for the limited stability.

A preferred method of preparing compositions of the present invention consists in first preparing a stable aqueous dispersion that comprises components A, B and D, but not component C. This stable aqueous dispersion will typically contain less water than the later composition of the present invention. It is a more concentrated precursor to the composition of the present invention, but does not as yet contain any component C. This concentrated dispersion is stable and can be stored for a prolonged period. It is only shortly before its use for treating fiber material that this concentrated dispersion is diluted and that a component C is added to it to improve suitability for exhaust processes.

In place of a single component A or B or C, compositions of the present invention may also comprise two or more products A which come within the abovementioned definition of component A; the same applies to components B and C.

A preferred method of preparing compositions of the present invention consists firstly in preparing an aqueous dispersion having a concentration of 20% to 80% by weight (this refers to the total presence of all constituents in the composition other than water) which comprises the components A, B, D and one or more dispersants, and shortly before use adding water and component C in such amounts that the final composition comprises 88% to 98%, preferably 93% to 97%, by weight of water and 5 to 20 g/l of said component C. The weight ratio of component A to component B in the final composition of the present invention is preferably in the range from 0.8:1 to 1.5:0.4 and preferably in the range from 2.0:1 to 2.5:1.

Compositions of the present invention have the particular advantage that when used for treating fiber Materials they provide good flame-retardant properties to the fiber materials at add-on levels of phosphorus compound on the fiber material that are lower than customary in the prior art. This is evidently attributable to a synergistic effect between the components A and B of compositions of the present invention, since the flame-retardant effect obtainable is distinctly higher than when component A is used alone or when component B is used alone. This synergistic effect is unexpected and surprising for a person skilled in the art, particularly because when component B is used alone, no flame-retardant effect is obtainable at all.

It is a further advantage of compositions of the present invention that both component A and component B can be selected from halogen-free compounds and good flame-retardant performance is obtainable nonetheless. Halogen-containing compositions known from the prior art, by contrast, can give rise to disadvantages which are known to a person skilled in the art.

Compositions of the present invention comprise at least one component A, at least one component B, at least one component C and at least one component D. They may also comprise mixtures of compounds falling within the hereinbelow recited definition of component A, and/or mixtures of compounds falling within the hereinbelow recited definition of component B, and/or mixtures falling within the hereinbelow recited definition of component C. They may additionally comprise further products falling neither within the definition of component A nor within the definition of component B nor within the definition of component C. Such products include for example known softeners for textiles, surfactants, carriers, diffusion accelerants, dyes, UV absorbers, and so on. Preferably, however, compositions of the present invention do not include any halogen compounds, nor preferably any polyesters other than those falling within the hereinbelow recited definition of component B.

Preferred embodiments of compositions of the present invention are characterized in that the weight ratio of said component A to said component B is in the range from 0.8:1 to 1.5:0.4 and preferably in the range from 2.0:1 to 2.5:1. This weight ratio is advantageously set in the course of the preparation of the abovementioned precursor, i.e., in the course of the preparation of a stable aqueous dispersion comprising components A and B and, if appropriate, one or more dispersants, but not as yet component C.

The aforementioned concentrated precursor to compositions of the present invention is generally obtainable in a simple manner by mixing the individual components together, if appropriate at a somewhat elevated temperature and/or with mechanical homogenization. This precursor can be further processed to a composition of the present invention by diluting with water and adding component C.

For some applications, it is advantageous to use compositions of the present invention in dispersed form. Contemplated for this purpose are in particular aqueous dispersions, and one or more dispersants can be used for dispersion in water. Useful dispersants are selected from products known to one skilled in the art in that, for example, nonionic ethoxylated compounds are suitable. Ethoxylated alcohols or ethoxylated carboxylic acids are contemplated here in particular. In addition to nonionic dispersants, it is in particular anionic dispersants such as, for example, alkali metal salts of carboxylic acids, alkali metal sulfates or alkali metal sulfonates which are also suitable. Similarly, it is possible to use mixtures comprising both nonionic and anionic dispersants. The concentrated precursors to compositions of the present invention are preferably prepared using dispersants that are desired in the final composition of the present invention.

Component A in the compositions of the present invention is a triester of orthophosphoric acid. That is, all 3 hydroxyl groups of orthophosphoric acid $O=P(OH)_3$ are esterified with alcoholic compounds. These 3 alcohol units can be the same or different. Preferably, all 3 alcohol units are selected from monohydric or dihydric aromatic alcohols. Phenol and resorcinol are particularly useful as alcohol units of the phosphoric triesters. A particularly preferred embodiment of compositions of the present invention is characterized in that said component A is a compound of formula (I) or of formula (II) or a mixture of these two compounds,

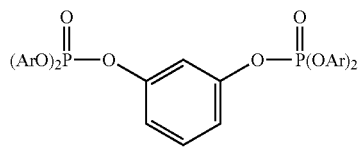
(II)

where Ar represents a univalent aromatic radical, preferably phenyl.

The compound of formula (II) where Ar is phenyl, hereinafter referred to as "RDP", is commercially available and is obtainable as taught in U.S. Pat. No. 5,457,221.

In lieu of or in addition to the preferred triesters mentioned, which contain aromatic radicals, compositions of the present invention may also comprise triesters of orthophosphoric acid which do not contain any aromatic radicals. Tri-n-butyl phosphate may be mentioned by way of example.

Component B in compositions of the present invention is a polyester constructed of units derived from an acid and an alcohol. It is very important that the units derived from an alcohol do not contain any aromatic radicals. Otherwise, it is impossible to achieve optimum flame-retardant performance for finished textiles, and/or other disadvantages arise.

Preferably, the polyesters used as component B contain no aromatic radicals at all; that is, the unit derived from an acid is preferably also free of aromatic radicals. Unlike the alcohol unit, however, the acid unit may contain minor fractions of aromatic radicals. However, the fraction in the polyester that is attributable to acid units comprising aromatic radicals must not exceed 10%, based on the total number of units derived from an acid.

A particularly preferred embodiment of compositions of the present invention is characterized in that said component B is a polyester constructed from an aliphatic α,ω-dicarboxylic acid and an aliphatic dihydric or polyhydric alcohol and preferably there is a hydroxyl group at each of the two chain ends of said dihydric or polyhydric alcohol.

Aliphatic α,ω-dicarboxylic acids having 4 to 10 carbon atoms, especially unbranched dicarboxylic acids of the type mentioned, are very useful as acids in the context of the preferred embodiment mentioned here. Particularly good results are obtainable when the polyester used as component B is constructed from adipic acid and an alcohol.

The alcohol moiety of the polyesters useful as component B is preferably derived from an aliphatic dihydric or polyhydric alcohol having a hydroxyl group at each of its two chain ends. The di- or polyhydric alcohol in question may have a branched or linear construction. Very useful alcohols for the polyesters include ethylene glycol, 1,3-propylene glycol, 1,4-butanediol, diethylene glycol, triethylene glycol, polyethylene glycol, neopentyl glycol and 1,6-hexanediol.

The polyesters used as component B can be constructed, as stated, from a dicarboxylic acid and an aliphatic di- or polyhydric alcohol. Another possibility is to use polyesters derived from hydroxy carboxylic acids, preferably from ω-hydroxy 1-carboxylic acids, where the acid and the alcohol units are present in the same molecule. The preparation of appropriate polyesters can proceed from the ω-hydroxy 1-carboxylic acid or from its lactone. Preference among the polyesters mentioned is given to those which are derived from caprolactone.

The polyesters useful as component B can be constructed from a single kind of carboxylic acid and from a single kind of alcohol. However, they can also be constructed from two or more different kinds of carboxylic acid and/or kinds of alcohol. Preferably, all carboxylic acids used and all alcohols used are selected from the compound classes recited above. Polyesters derived from a mixture of caprolactone and polyhydric alcohol, for example neopentyl glycol, are also very useful as component B. An example thereof is TONE® Polyol 2241 product from Dow.

The molecular weight of the polyester used as component B is preferably in the range from 200 to 8000. Polyesters having a molecular weight in the range from 500 to 4000 are particularly useful.

Component C in compositions of the present invention is an amine or an ammonium salt. When an ammonium salt is used as component C, its cation is of the form $NR_4^{\oplus}$. At least one of the 4 R radicals has to be an alkyl radical of 1 to 22 carbon atoms; one or more of the other 3 R radicals can be hydrogen or likewise an alkyl radical of the kind mentioned. Particularly useful as component C are secondary amines or their corresponding ammonium salts. Open-chain secondary amines are here superior to secondary amines having cyclic radicals. It is also possible to use polymeric amines as component C, for example LUPAMIN® products from BASF (polyamines based on vinylamine). When polymeric amines are used, it is advantageous in a whole series of cases when small amounts of an acid, for example acetic acid or hydrochloric acid, are added. Particularly preferred amines are polyethyleneimines, diethylenetriamine and triethylenetetramine. By way of suitable ammonium salts it is possible to mention chlorides such as polydiallyldimethylammonium chloride for example.

It will be appreciated that mixtures of the compounds mentioned can also be used with advantage as component C. When choosing component C, care should be taken to ensure that the stability of the concentrated precursor mentioned be diminished by adding component C.

Examples follow to illustrate the present invention.

EXAMPLES

Knitted polyester is introduced into a high temperature dyeing vessel. This vessel is subsequently filled with the liquor of the hereinbelow stated composition, in an amount which is 20 times the weight of the knitted polyester. The liquor contained 24% of a component C (amine) when component C is the hereinbelow recited auxiliary A, or 32% of a component C when component C is the hereinbelow recited auxiliary B or D, as indicated in claim 1 (used as 2.5% by weight solution in water)

2% of a wetting agent

8% of a buffer solution (pH 4.5)

50% of a 33% by weight dispersion of a flame retardant.

These numbers/amounts are based on the weight of the knitted polyester in the dry state.

Various liquors of the abovementioned composition were used, namely either liquors comprising "auxiliary A" or "auxiliary B" or "auxiliary D" as component C. Liquors comprising no component C, i.e., none of the "auxiliaries" A, B or D, were used as (non-inventive) comparative liquors.

Auxiliary A=polyethyleneimine (LUPASOL® FC from BASF)

Auxiliary B=diethylenetriamine

Auxiliary D=triethylenetetramine

To treat the knitted polyester with the respective liquor, some runs were carried out using a high temperature (HT) process, others using a process at 90° C. The two processes are described in what follows:

High Temperature Process:

The liquor which contains the knitted polyester is heated from room temperature to 135° C. during 110 minutes and then maintained at 135° C. for 60 minutes and finally cooled down to 40° C. over 55 minutes. Thereafter, the polyester is rinsed and conventionally reduction cleared with a liquor based on sodium dithionite solution, 2 g/l in admixture with 1.65 g/l of sodium hydroxide, then neutralized with acetic acid (60%) and dried.

Process at 90° C.:

The liquor is heated from room temperature to 90° C. during 20 minutes, then maintained at 90° C. for 90 minutes and finally cooled down to 40° C. during 40 minutes. Thereafter, the polyester is rinsed and conventionally reduction cleared with sodium dithionite, neutralized with 60% acetic acid and dried.

The dispersion of flame retardant is composed of RDP and a polycaprolactone (TONE® Polyol 2241 from Dow) in a weight ratio of 2.33:1 and the dispersants mentioned hereinbelow.

Preparing the dispersion of flame retardant:

First, a mixture of water, the dispersants and the pH control agent is prepared using a high speed stirrer. The organic phase of RDP and polymer is heated in another vessel to 60-70° C. and uniformly homogenized using a high speed stirrer. This oily phase is then admixed with the mixture of dispersants with water, either in the form of a mixture or as a clear solution. This mixture is then processed with a high speed stirrer to form a pre-emulsion. All mixing steps are advantageously carried out at elevated temperature, preferably at 60-70° C.

The abovementioned pH control agent was a buffer in the form of a salt of phosphoric acid. The dispersants are reported in table 1 below.

The resulting pre-emulsion of aqueous phase and oily phase is then subjected to a high pressure dispersion using a high pressure homogenizer. The resultant dispersion I or II is used for the experiments summarized below.

TABLE 1

| Dispersion No. | Dispersant A | Dispersant B | Buffer to pH | Ionogenicity |
|---|---|---|---|---|
| I | Marlipal 13/200 | Marlipal 13/060 | 5.6 | nonionic |
| II | Rewopol NOS 25 | Marlipal 13/200 | 5.6 | anionic |

The resulting add-on on the fabric was determined in % by weight for each experiment. In addition, each sample was tested to DIN 54336 to determine its burn time.

The results are reported in table II below, in which "BZ" denotes the after-burn time in seconds as determined by following DIN 54336. Higher values for burn time indicate a lower/worse level of flame protection.

TABLE II

| Dispersion No. | HT or 90° C. | Auxiliary | Add-on (% by weight) | Burn test to DIN (BZ = after-burn time) in seconds |
|---|---|---|---|---|
| I | HT | none | 9.0% | 49 |
| I | HT | A* | 11.0% | 0 |
| I | HT | B* | 9.4% | 8 |
| I | HT | D | 10.3% | 1 |
| II | HT | none | 5.1% | 37 |
| II | HT | A* | 12.2% | 0 |
| II | HT | B* | 5.3% | 7 |
| II | HT | D | 6.1% | 2 |
| I | 90° C. | none | 5.1% | 40 |
| I | 90° C. | A* | 10.1% | 0 |
| I | 90° C. | B* | 5.5% | 2 |
| I | 90° C. | D | 6.3% | 6 |
| II | 90° C. | none | 2.9% | 33 |
| II | 90° C. | A* | 11.1% | 0 |
| II | 90° C. | B* | 3.5% | 21 |
| II | 90° C. | D | 3.6% | 22 |

*A = LUPASOL® FC polyethyleneimine having a number average molecular weight of 800-1000, supplied by BASF®.
B = diethylenetriamine
D = triethylenetetramine Conclusions which can be drawn from these results are as follows:

The inventive addition of auxiliaries A or B or D to the liquor provides a higher rate of exhaustion. At comparatively low temperatures, LUPASOL® FC is more effective than other auxiliaries mentioned in the experiments, while the differences are less clear-cut at comparatively high temperatures. An adequate rate of exhaustion is ensured with the inventive liquors not only from anionic but also nonionic dispersions in the exhaust liquor.

What is claimed is:

1. A flame retardant composition for treating a fiber material comprising at least a component A, a component B, a component C and a component D, wherein said component A is a triester of phosphoric acid being present in a flame retardant effective amount, wherein said component B is a polyester which does not contain any aromatic radicals in the unit derived from the alcohol and wherein 0% to 10% of the units derived from the acid contain aromatic radicals, wherein said component C is an amine comprising a secondary amine or a polymeric amine, or an ammonium salt wherein the cation of this ammonium salt is of the form $NR_4^+$ where at least one of the R radicals is alkyl of 1 to 22 carbon atoms, and wherein said component D is water, wherein every one of said components A, B and C may take the form of a mixture of two or more components A, B and C, respectively, in place of a single component A product, component B product and component C product, respectively and wherein the composition comprises from 5 to 20 g/l of said component C and the fiber material is textile fabric.

2. The composition as claimed in claim 1, characterized in that it comprises 88% to 98% by weight of said component D.

3. The composition as claimed in claim 1, characterized in that the weight ratio of said component A to said component B is in the range from 0.8:1 to 1.5:0.4.

4. The composition as claimed in claim 1, characterized in that said component A is a triester constructed from units derived from phosphoric acid and units derived from mono- or dihydric aromatic alcohols, said trimester being a compound of formula (I) or of formula (II) or a mixture of these two compounds,

-continued

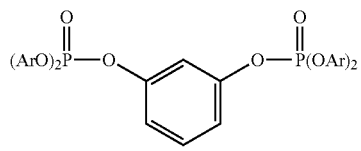

(II)

where Ar represents a univalent aromatic radical.

5. The composition as claimed in claim 1, characterized in that said component B is a polyester constructed from an aliphatic α,ω-dicarboxylic acid and an aliphatic dihydric or polyhydric alcohol.

6. The composition as claimed in claim 5, characterized in that said aliphatic dicarboxylic acid has 4 to 10 carbon atoms.

7. The composition as claimed in claim 5, characterized in that said aliphatic alcohol is selected from ethylene glycol, 1,3-propylene glycol, 1,4-butanediol, diethylene glycol, triethylene glycol, polyethylene glycol, neopentyl glycol and 1,6-hexanediol.

8. The composition as claimed in claim 4 characterized in that said component B is a polyester derived from an ω-hydroxy 1-carboxylic acid or its lactone.

9. The composition as claimed in claim 1, characterized in that said component B has a molecular weight in the range from 200 to 8000.

10. The composition as claimed in claim 1, characterized in that said component C is a polyethyleneimine or triethylenetetramine or diethylenetriamine or a mixture comprising two or three of these amines.

11. The composition as claimed in claim 1, characterized in that said component C is an ammonium salt whose anion is chloride.

12. A process for treating a fiber material, which comprises contacting said fiber material with a composition as claimed in claim 1 wherein said fiber material is textile fabric.

13. The process as claimed in claim 12, characterized in that it is an exhaust process carried out at a temperature in the range from 60° C. to 100° C.

14. The process as claimed in claim 12, characterized in that said fiber material consists of polyester to an extent ranging from 80% to 100% by weight.

* * * * *